United States Patent [19]
Hiroshima

[11] Patent Number: 6,065,780
[45] Date of Patent: May 23, 2000

[54] VIBRATION-ISOLATOR JOINT FOR VACUUM DEVICE

[75] Inventor: Hiroshi Hiroshima, Tsukuba, Japan

[73] Assignee: Agency of Industries Science & Technology, Ministry of International Trade & Industry, Tokyo, Japan

[21] Appl. No.: 09/173,713

[22] Filed: Oct. 16, 1998

[30] Foreign Application Priority Data

Oct. 27, 1997 [JP] Japan .................................. 9-293071

[51] Int. Cl.[7] .................................................. F16L 11/12
[52] U.S. Cl. ............................................. 285/49; 285/226
[58] Field of Search .............................. 248/560; 285/49, 285/226

[56] References Cited

U.S. PATENT DOCUMENTS 1,499,050   6/1924   Broome ..................................... 285/49
3,038,553   6/1962   Peters ........................................ 285/49
5,775,737   7/1998   Morgner et al. .......................... 285/49

*Primary Examiner*—Dave W. Arola
*Attorney, Agent, or Firm*—Oblon, Spivak, McClelland, Maier & Neustadt, P.C.

[57] ABSTRACT

A vibration-isolator joint for a vacuum device is connected to a vacuum pump and to a vacuum chamber used to evacuate the vacuum chamber. The joint includes a bellows having an internal portion via which evacuation is effected, a first end connected to the vacuum pump, a second end connected to the vacuum chamber, and a support structure that, when the bellows has been compressed by a prescribed amount, prevents further compression of the bellows and also communicates to the bellows vibration in a direction other than the direction in which the bellows expands and contracts.

6 Claims, 5 Drawing Sheets

VIBRATION-ISOLATOR JOINT FOR VACUUM DEVICE

BACKGROUND OF THE INVENTION

1. Field of the Invention

This invention relates to a joint that is able to prevent communication to a vacuum chamber of vibration generated by a vacuum pump being used to evacuate the vacuum chamber.

2. Description of the Prior Art

Figure 5:
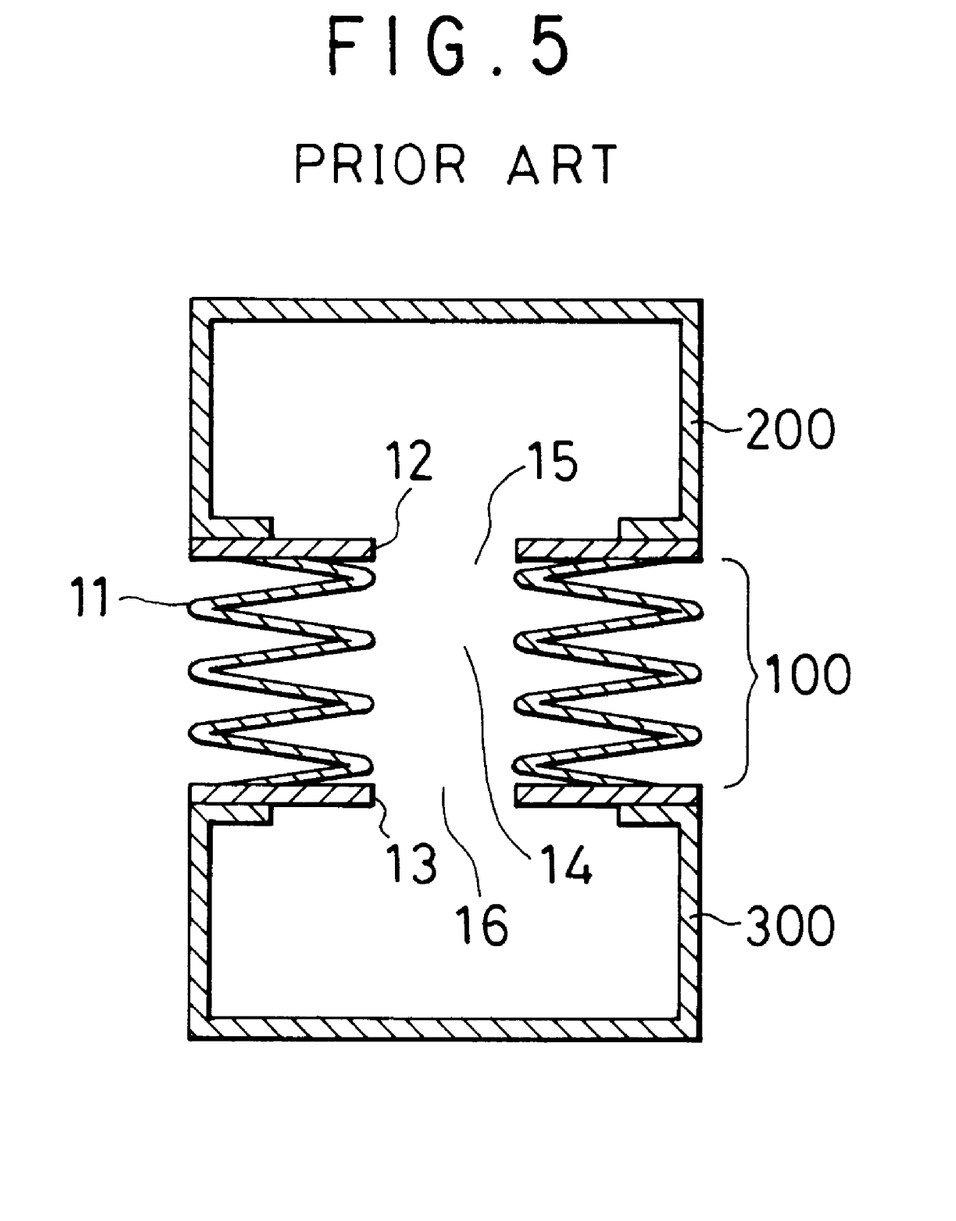
FIG. 5 is a cross-sectional view showing a conventional vibration-isolator joint for a vacuum device in which a bellows is used for the joint.

Vibration-isolator joints for vacuum devices are used that employ a bellows or a bellows and a damper to damp vibration. FIG. 5 is a cross-sectional view of a conventional bellows type joint.

With reference to FIG. 5, a joint 100 comprises a bellows 11 with an internal evacuation passage 14, having at the upper end an upper flange 12 with a hole 15, and at the lower end a lower flange 13 with a hole 16. The upper flange 12 is hermetically connected to a vacuum chamber 200 that is to be evacuated, and the lower flange 13 is hermetically connected to a vacuum pump 300.

When the vacuum pump 300 is activated, air is evacuated from the evacuation passage 14 of the bellows 11, thereby causing the bellows 11 between the upper flange 12 and lower flange 13 to be compressed by atmospheric pressure. If the bellows 11 has a low rigidity the joint 100 will not be able to effect its vibration isolation function, since the bellows 11 will be squeezed flat, allowing vibration to be communicated directly to the vacuum chamber 200. On the other hand, if the bellows 11 has a high rigidity, the high rigidity itself will also serve to communicate vacuum pump vibration to the vacuum chamber, degrading the vibration isolation function.

The compressive force acting on the upper and lower flanges of the bellows 11 is proportional to the area of the bellows opening. Thus, in the case of a bellows 11 having an opening with a diameter of 200 mm, the compressive force will be 300 kg or more. This means that as the diameter of a bellows is increased, a more rigid bellows has to be used, resulting in a deterioration of the bellows' vibration isolating performance.

An object of the present invention is to provide a vibration-isolator joint for a vacuum device that enables the use of a bellows having low rigidity, even when the joint has a large diameter.

SUMMARY OF THE INVENTION

For achieving this object, the present invention provides a vibration-isolator joint for a vacuum device, the joint being connected to a vacuum pump and a vacuum chamber in an arrangement that allows the vacuum chamber to be evacuated, the joint comprising a bellows having an internal portion comprising an evacuation passage having a first end connected to the vacuum pump and a second end connected to the vacuum chamber, and a support structure that, when the bellows has been compressed by a prescribed amount in an expansion and contraction direction, prevents further compression in that direction and communicates to the bellows vibration in a direction other than the expansion and contraction direction.

In accordance with the above arrangement, a support structure is provided in the expansion and contraction direction of the bellows. When the vacuum pump is activated and starts to compress the bellows, or compresses the bellows by a set length, the support structure operates to prevent any further compression of the bellows. Since the bellows is therefore subjected to virtually no pressure, the bellows may be formed of a material having low rigidity. Even if a bellows having a large opening area is used, the bellows may still be formed of a material having low rigidity, which improves the vibration-isolating effect and is economical.

The above and other features of the present invention will become apparent from the following description made with reference to the drawings.

DESCRIPTION OF THE PREFERRED EMBODIMENTS

Figure 1A:
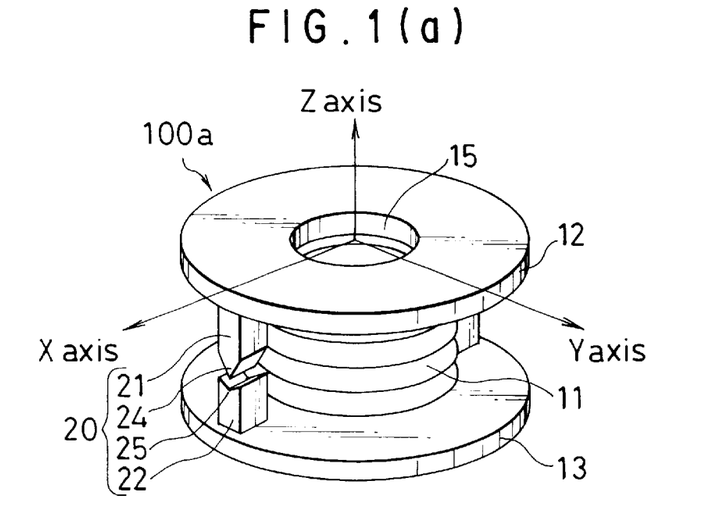
FIG. 1(a) is a perspective view showing the basic configuration of a vibration-isolator joint for a vacuum device according to the present invention.
Figure 1B:
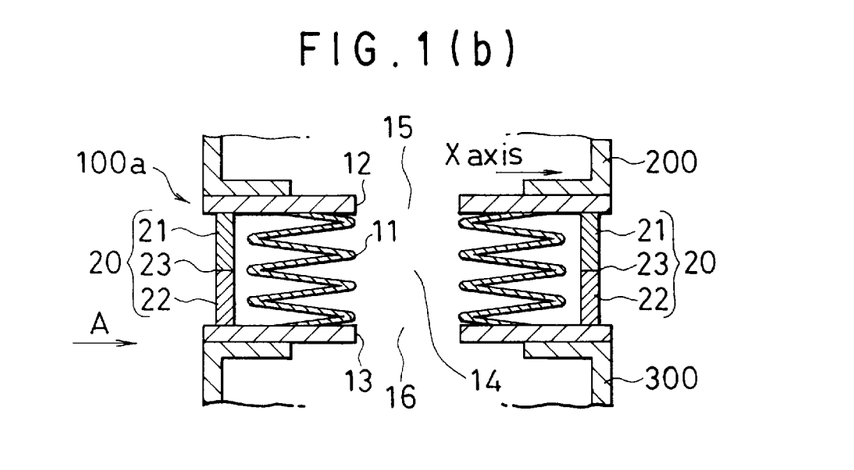
FIG. 1(b) is a cross-sectional view of the joint of FIG. 1(a).
Figure 1C:
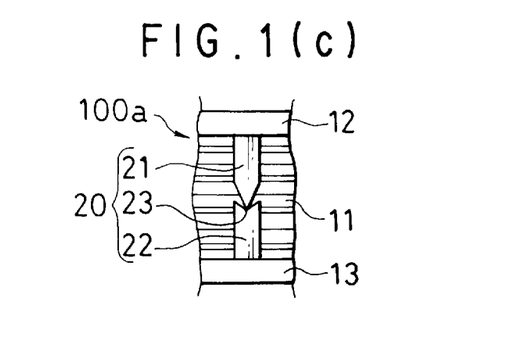
FIG. 1(c) is a partial side view of the joint of FIG. 1(a).

FIG. 1 shows the basic configuration of a vibration-isolator joint 100a for a vacuum device according to the present invention, with FIG. 1(a) being a perspective view, FIG. 1(b) a cross-sectional view, and FIG. 1(c) a side view as seen from the direction indicated in FIG. 1(b) by arrow A. In FIGS. 1 and 5, the same reference numerals and symbols are used to denote parts that are the same.

The difference between the joint 100a of the present invention and the conventional joint 100 of FIG. 5 is that the joint 100a is provided at two locations along the X axis with a support structure 20 comprising an upper support part 21 and a lower support part 22, with each support part being free in one direction. More specifically, each upper support part 21 is in the form of a square pillar that is attached to the underside of the upper flange 12 and has a V-shaped lower end 24, while each lower support part 22 is in the form of a square pillar that is attached to the upper side of the lower flange 13 and has a V-shaped groove 25 in the upper end thereof, in a position of opposition to the upper support part 21. These pairs of upper support parts 21 and lower support parts 22 are located at opposite sides of the holes 15 and 16 of flanges 12 and 13. When the vacuum pump 300 is activated, the bellows 11 contracts, drawing the flanges 12 and 13 toward each other, bringing the support parts 21 and 22 into a line contact that forms a fulcrum point 23, as shown in FIGS. 1(b) and 1(c). This stops further contraction of the bellows 11 and produces a pivotal action about the X axis through the two fulcrum points 23, thereby absorbing vibration.

The fulcrum point 23 is formed by the line contact produced when the evacuation by the vacuum pump 300 axially contracts the bellows 11 by a prescribed amount. Thus, when the vacuum pump 300 is not in operation, or when the displacement of the bellows 11 is small, the upper support part 21 and lower support part 22 are separated by a prescribed distance, as shown in FIG. 1(a).

When the force that the bellows will be subjected to is small, the upper and lower support parts may be formed of hard plastic. However, when the force involved is 500 kg or more, the support parts are formed of steel. The support parts may be formed in any shape, depending on the forces involved. While it depends on the length of the bellows, the upper and lower support parts may be in anything from a state of light contact with each other to a state of separation of several millimeters.

Also, since the support structures are provided so that they face each other in mutual opposition across the center axis of the bellows, when the vacuum pump is in operation, the flange connected with the vacuum pump pivots about a line connecting the location points of the support structures, thereby suppressing transmission of the vacuum pump vibration.

The functioning of the joint 100a will now be described. When the joint 100a is in the state shown in FIG. 1(a) and the upper flange 12 is connected to the vacuum chamber 200 and the lower flange 13 is connected to the vacuum pump 300 (FIG. 1(b)), and evacuation is started, the negative pressure produced by the suction exerts a downward force on the upper flange 12, subjecting the bellows 11 to a compressive force. In a conventional arrangement this force acts on the bellows 11 itself, compressing the bellows 11. However, in the arrangement according to the present invention, when the bellows has contracted by a set length, the initially separated upper support parts 21 and lower support parts 22 of the pair of support structures 20 come into contact, forming fulcrum points 23 that thereby prevent further contraction of the bellows 11. This arrangement therefore makes it possible to use a bellows 11 having low rigidity. Moreover, with respect to the arrangement of FIG. 1(b), vibration perpendicular to the direction of the line contact of the two fulcrum points 23 generates a pendulum motion of the lower flange 13 about a center axis constituted by the straight line between the two fulcrum points 23, that damps communication of the vibration produced by the vacuum pump 300, thereby preventing the vibration being communicated to the vacuum chamber 200.

Figure 2A:
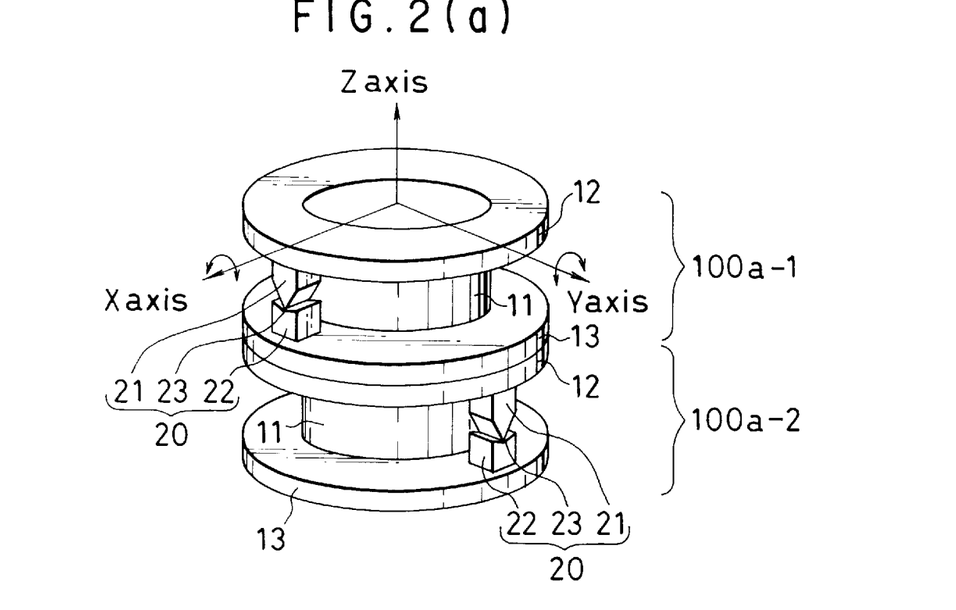
FIG. 2(a) is a perspective view of an embodiment comprising the associated use of two of the joints shown in FIG. 1.
Figure 2B:
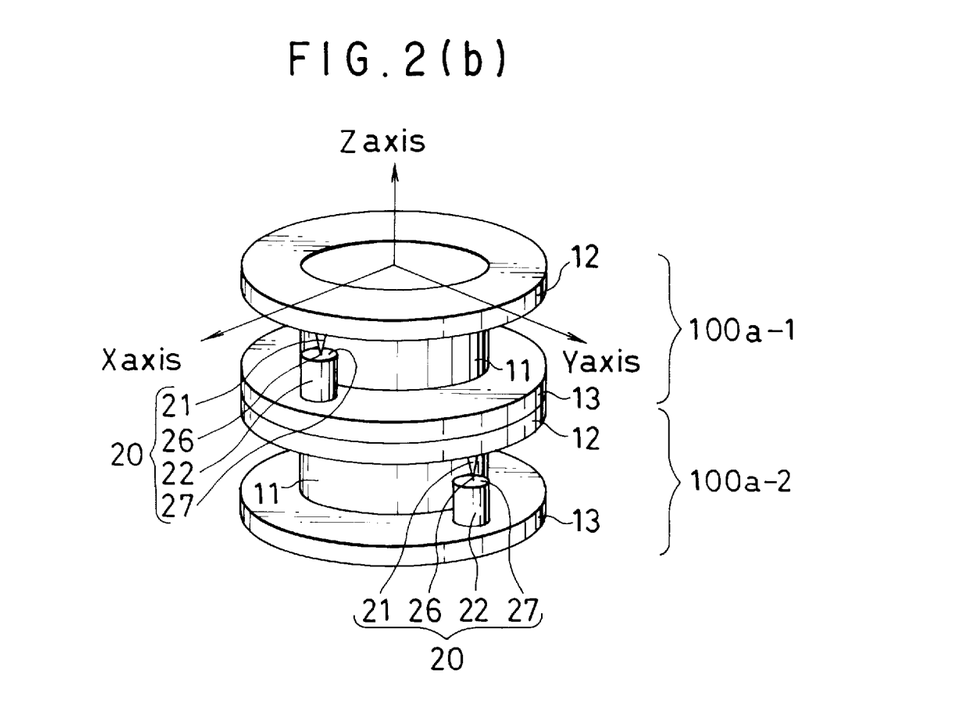
FIG. 2(b) is a perspective view showing another embodiment of the support structure of FIG. 2(a).

FIG. 2 illustrates an embodiment that uses more than one joint 10a (two, in the example actually illustrated), with FIG. 2(a) being a perspective view, and FIG. 2(b) being a perspective view showing an arrangement in which the support structure 20 has a different configuration compared to that of FIG. 2(a). In FIG. 2, parts that are the same as parts shown in FIG. 1 have been given the same reference numerals or symbols. The vibration-isolating joints 100a-1 and 100a-2 have the same configuration and are joined together, but the support structures 20 on the joints 100a-1 and 100a-2 are located at points mutually offset by 90 degrees around the Z axis. The result is to isolate vibration by using the joint 100a-1 to convert Y-axis vibration into a pivotal action about the X axis and using the joint 100a-2 to convert X-axis vibration into pivotal action about the Y axis. For simplicity, the bellows 11 is not precisely shown in FIG. 2. In FIG. 2(a) the upper support part 21 and lower support part 22 constituting each support structure 20 are shown as square pillars, the same as in the embodiment illustrated by FIG. 1. However, in the case of the arrangement shown in FIG. 2(b), upper support part 21 is a cone-shaped part that is attached to the underside of the upper flange 12, and lower support part 22 is in the form of a round pillar that is attached to the upper side of the lower flange 13 and has a top 27 with a cone-shaped recess, the two support parts being arranged so that the conical tip of the upper support part 21 fits into contact with the top 27 of the lower support part 22, forming a fulcrum point 26. Thus, the two support parts form a point contact, like a pivot bearing. This is an arrangement that can be effectively utilized in cases where the compressive force on the bellows is small.

With respect to FIGS. 2(a) and 2(b), when the vacuum device is not in operation or when the displacement of the bellows 11 is small, the upper support part 21 and lower support part 22 are not in contact, so the fulcrum points 23 and 26 do not function as fulcrums.

When vibration arises in the case of the configurations shown in FIG. 2, the upper flange 12 pivots about the X axis and the lower flange 13 pivots about the Y axis, in addition to which the fact that the joints are connected together also helps to prevent vibration by maintaining the planes of the topmost and bottommost flange surfaces parallel to each other.

Figure 3A:
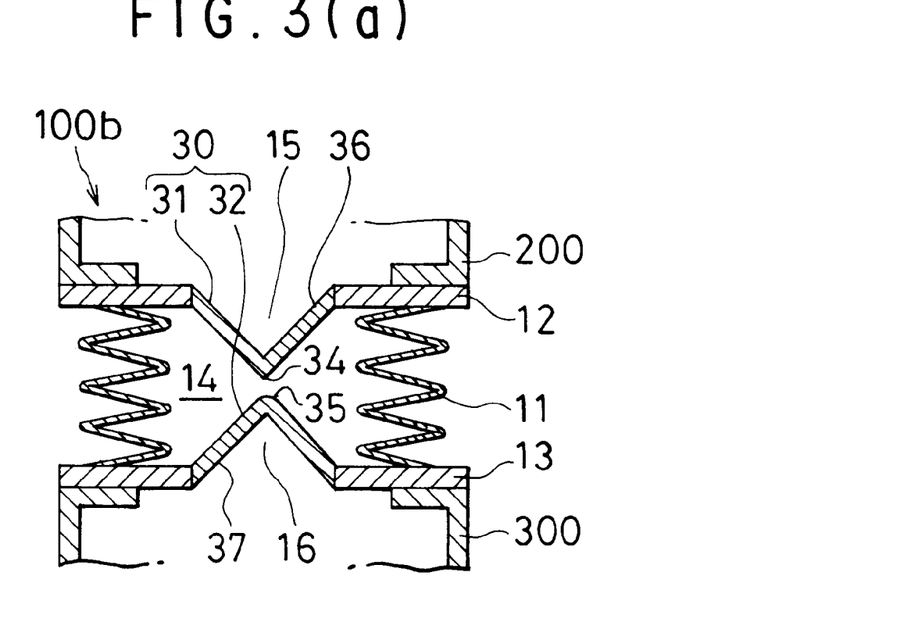
FIG. 3(a) is a cross-sectional view of another embodiment of the joint of the present invention.
Figure 3B:
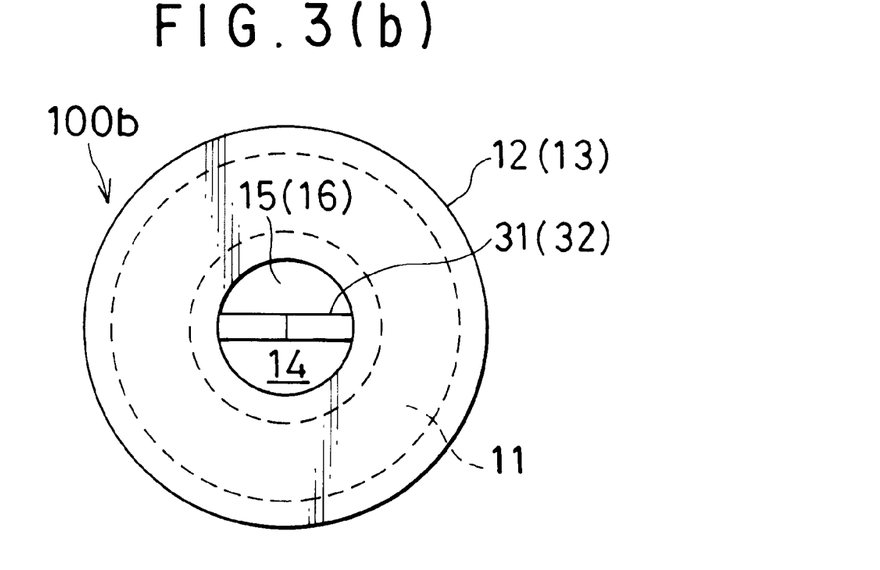
FIG. 3(b) is a plan view of the joint of FIG. 3(a).

FIG. 3 shows an embodiment of a joint that uses a simple structure to isolate vibration in two directions, FIG. 3(a) being a cross-sectional view and FIG. 3(b) a plan view.

In FIG. 3, the same reference numerals and symbols are used to denote parts that are the same as those shown in FIG. 1. The upper end of bellows 11 is hermetically connected to upper flange 12 having a hole 15 and the lower end of the bellows 11 is hermetically connected to a lower flange 13 having a hole 16. The upper flange 12 is provided with a dual leg 36 constituted by a V-shaped upper support part 31 attached to the rim portion of a hole 15, the upper support part 31 facing down into the evacuation passage 14 and having a cone-shaped end 34.

Similarly, the lower flange 13 is provided with a dual leg 37 constituted by a V-shaped lower support part 32 attached to the rim portion of a hole 16, the lower support part 32 facing upward and having a round, pillar-shaped end 35, the upper surface of which has a conical recess, the end 35 being thereby arranged in opposition to the end 34 of the upper support part 31 with a slight gap maintained between the two ends 34 and 35. Together, these support parts 31 and 32 constitute a support structure 30.

When the vacuum pump 300 is activated and the bellows 11 contracts, the flanges 12 and 13 are drawn toward each other, bringing the cone-shaped end 34 of the upper support part 31 into contact with the end 35 of the lower support part 32, whereby the end 34 is supported on one point by the end 35, like a pivot bearing, preventing further contraction of the bellows 11. The legs 36 and 37 of the support parts 31 and 32 are formed of a material that is not deformed by the compressive force.

In the joint 100b thus configured according to this embodiment the two support members use a one-point support to suppress vibration in two directions, as in the joints of FIG. 2.

Figure 4A:
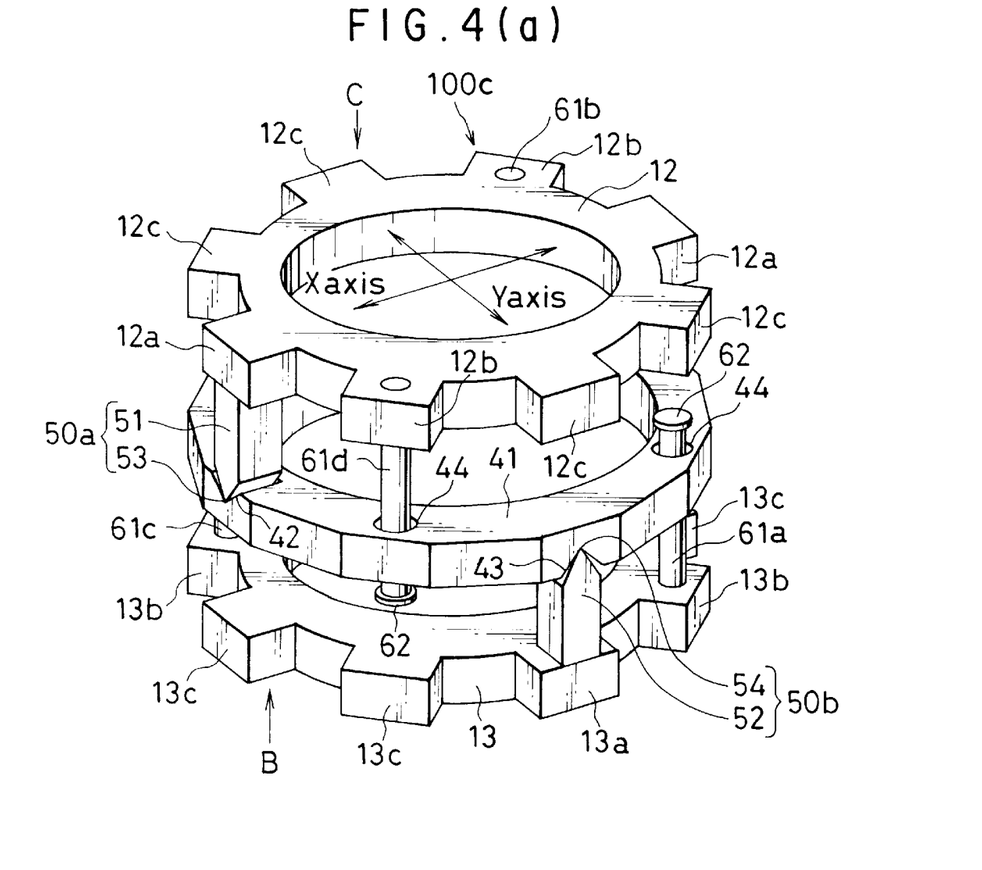
FIG. 4(a) is a perspective view of another embodiment of the joint of the present invention.
Figure 4B:
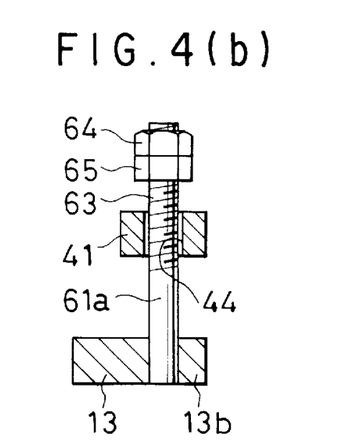
FIG. 4(b) is a cross-sectional view of an embodiment of the pin used in the joint of FIG. 4(a).
Figure 4C:
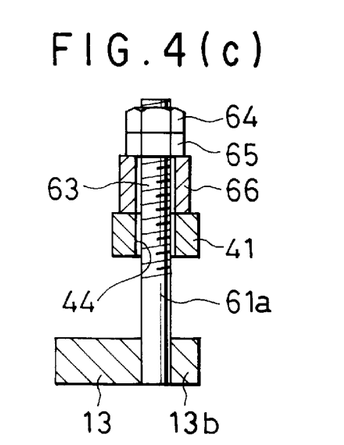
FIG. 4(c) is a cross-sectional view of another embodiment of the pin used in the joint of FIG. 4(a).

FIG. 4 illustrates another embodiment of a joint configured to isolate vibration in two directions, with FIG. 4(a) being a perspective view, and FIGS. 4(b) and 4(c) being cross-sectional views of examples of the pins used in the joint of FIG. 4(a), shown with nuts on the pins.

In FIG. 4(a), the same reference numerals and symbols are used to denote parts that are the same as those shown in FIG. 1. The vacuum chamber, vacuum pump and bellows are not shown in FIG. 4. The difference between the joint 100c of this embodiment and the joints of FIGS. 1 to 3 is that joint 100c has a median ring 41 between the upper flange 12 and the lower flange 13. A bellows (not shown) such as the one shown in FIG. 1 is attached to the upper flange 12 and lower flange 13, and the flanges 12 and 13 each have a plurality (eight, in this example) of outwardly-extending, equidistantly spaced projections 12a, 12b, 12c and 13a, 13b, 13c.

The inner circumference of the median ring 41 is substantially the same size as the outer circumference of the upper and lower flanges 12 and 13; that is, the same size as the part of the flanges where the projections join the flanges.

Each of a pair of projections 12a located along the X axis of the upper flange 12 has an upper support part 51 with a V-shaped end, the upper support part 51 extending down from the underside of the projection 12a. Similarly, each of a pair of projections 13a located along the Y axis of the lower flange 13 has a lower support part 52 with a V-shaped end, the lower support part 52 extending up from the upper side of the projection 13a. The median ring 41 is provided with V-shaped grooves 42 and 43 at locations facing the ends of the support parts 51 and 52, constituting support structures 50a and 50b.

The upper flange projections 12b, each located adjacent to a projection 12a, have pins 61b and 61d each having a head 62 and being inserted through a hole 44 provided in the median ring 41. Similarly, the lower flange projections 13b, each located adjacent to a projection 13a, have pins 61a and 61c each having a head 62 and being inserted through a hole 44 provided in the median ring 41. The holes 44 are formed with a large enough inside diameter to ensure that the outside diameter of each of the pins 61a to 61d is accommodated without the pins touching the median ring 41, even when the pins are moved vertically.

FIG. 4(b) shows an example of a pin 61a provided on the projection 13b of the lower flange 13. The upper part of the pin has a thread 63 on which two nuts 64 and 65 are mounted. The length of the pin is adjusted by adjusting the position of the nuts.

FIG. 4(c) shows another example of the pin 61a; the same configuration can be used for pins 61b, 61c and 61d. The functioning of the vibration-isolating joint of FIG. 4(a) will now be explained.

With respect to FIG. 4(a), when the vacuum pump is not in operation, or when the bellows has a small displacement, there is no contact between the upper support parts 51 and the grooves 42 of the median ring 41, or between the lower support parts 52 and the grooves 43.

When the vacuum pump is operated, the bellows contracts until a line contact is formed between each upper support part 51 and groove 42 on the median ring 41, and between each lower support part 52 and groove 43, thereby preventing further contraction of the bellows. When the vacuum pump continues to operate, the vibration thus produced causes the upper flange 12 to pivot about the upper support part fulcrum points 53 (X axis), and the lower flange 13 to pivot about the lower support part fulcrum points 54 (Y axis), thereby substantially isolating the vacuum pump vibration to the vacuum chamber.

During operation of the vibration-isolator joint, if the projection 13c on the X axis of the lower flange 13, that is, the projection 13c indicated by arrow B, is pushed upward by inadvertent application of an abnormal force, the result is a pivotal action of the lower flange 13 about lower support part fulcrum points 54 located along the Y axis. Since in this case the indicated projection 13c of the lower flange 13 is pushed upward toward the median ring 41 without changing the positional relationship between the upper flange 12 and the median ring 41, the lower flange 13 pivots about a center axis formed by the fulcrum points 54, causing the pin 61a provided on a projection 13b to descend and bringing the head 62 of the pin 61a close to the median ring 41. When the force by which the indicated projection 13c is moved is small, there is little displacement of the pin 61a, so the head 62 does not contact the median ring 41. However, when the force is large, this produces a correspondingly large displacement of the pin 61a that brings the head 62 into contact with the median ring 41.

Thus, there is no further displacement of the lower flange 13 even if the force applied is increased, thereby preventing extension of the bellows on the pin 61a side by more than a set amount. If the projection 13c is pushed in the opposite direction, that is, downward, by application of an abnormal force, this will cause the pin 61c provided on the projection 13b on the opposite side to descend, and thereby to function in the same way described with reference to the pin 61a, preventing the bellows from extending by more than the set amount.

A strong downward push on a projection 12c located on the Y axis of the upper flange 12, as indicated by arrow C, causes pivoting of the upper flange 12 about a center axis formed by the fulcrum points 53 between the upper support parts 51 and the grooves 42 located along the x axis. Since in this case the indicated projection 12c of the upper flange 12 is pushed downward toward the median ring 41 without changing the positional relationship between the lower flange 13 and the median ring 41, the pivoting of the upper flange 12 about the fulcrum points 53 brings the head 62 of the pin 61d up toward the median ring 41. If the force applied is large, the head 62 of the pin 61d is brought into contact with the median ring 41, which by preventing any further such displacement prevents abnormal extension of the bellows. Conversely, if the projection 12c is subjected to an abnormally strong force in the opposite direction, that is, upward, the pin 61b provided on the projection on the opposite side is drawn up, thereby also functioning to prevent the bellows being extended by more than the set amount.

The nuts 64 and 65 provided on the pins 61a to 61d, as shown in FIGS. 4(b) and 4(c), enable the degree of pivotal rotation of the upper flange 12 and lower flange 13 to be adjusted.

When the pins 61a to 61d having the configuration shown in FIG. 4(b) are used, the length of the pins can be adjusted by adjusting the position of the nuts 64 and 65, thereby enabling the range of pivotal movement of the upper and lower flanges to be adjusted.

In the arrangement shown in FIG. 4(c), a damper 66 formed of a soft synthetic resin or rubber is disposed between the median ring 41 and the nut 65. This damper 66 prevents the shock of abutment contact between the nut 65 and median ring 41, suppresses fine vibrations of the upper flange 12 and lower flange 13 and controls vibration from the vacuum pump resonating in the joint.

Thus, while with the joint 100a of FIG. 1 vibration is prevented in just one direction around the X axis, since the joint 100c of FIG. 4 is configured so that the X and Y axes intersect in the same plane, the joint 100c can isolate vibration in two directions.

As described in the foregoing, one end of the vibration-isolator joint for a vacuum device according to the present invention is connected to a vacuum pump that is the source of the vibration, the other end is connected to a vacuum chamber, the inside of the joint is an evacuation passage formed by a bellows, and the joint is provided with a support structure that, when the bellows has been compressed by a prescribed amount in an expansion and contraction direction, prevents further compression in that direction and communicates to the bellows vibration in a direction other than the expansion and contraction direction. Thus, compression of the bellows is prevented by this support structure that provides support between the ends of the bellows and is able to withstand the compressive force involved. As such, vibration can be effectively isolated by using a bellows having low rigidity, and therefore having a high vibration-preventing effect.

The present invention can be used to isolate vibration in multiple directions by using a configuration comprising a plurality of joints connected together, which also serves to isolate vibration while maintaining the planes of the topmost and bottommost flange surfaces parallel to each other.

What is claimed is:

1. A vibration-isolator joint for a vacuum device, said joint comprising:

a bellows having an internal evacuation passage, a first flange connected to a vacuum chamber, said first flange being provided on a first end of the bellows, a second flange connected to a vacuum pump, said second flange being provided on a second end of the bellows, at least one first support part provided on the first flange facing the second flange, at least one second support part provided on the second flange at a location in opposition to the at least one first support part, wherein the at least one first support part and the at least one second support part are brought into line or point contact with each other when the bellows is compressed to swing at least one of the first flange and the second flange.

2. The vibration-isolator joint according to claim 1, wherein the at least one first support part comprises a pair of first support parts and the at least one second support part comprises a pair of second support parts, said pairs of first and second support parts being provided at outer sides of connections between the first and second flanges and the bellows.

3. The vibration-isolator joint according to claim 2, wherein the pair of first support parts are opposed to each other with the flange center axis as a center, and the pair of second support parts are opposed to each other, with the flange center axis as a center.

4. The vibration-isolator joint according to claim 1, wherein the at least one first support part comprises a single first support part and the at least one second support part comprises a second support part, each of said single first support part and said single second support part being provided at an inner side of connections between the first and second flanges and the bellows, said single first support part and said single second support part being brought into point contact with each other within the internal evacuation passage when the bellows is compressed.

5. A vibration-isolator joint for a vacuum device, said joint comprising:

a bellows having an internal evacuation passage;

a first flange connected to a vacuum chamber, said first flange being provided on a first end of the bellows;

a second flange connected to a vacuum pump, said second flange being provided on a second end of the bellows;

a median ring swingably disposed around an outer periphery of the bellows and between the first flange and the second flange;

a pair of first support parts provided at two locations on opposite sides of the first flange and extending down toward an upper surface of the median ring;

a pair of second support parts provided at two locations on opposite sides of the second flange and extending up toward a lower surface of the median ring, said pair of second support parts being offset by 90 degrees around a flange center axis from said pair of first support parts;

a pair of first grooves formed in an upper surface of the median ring and facing the pair of first support parts; and a pair of second grooves formed in a lower surface of the median ring and facing the pair of second support parts;

wherein the pair of first support parts and the pair of second support parts are engaged in the pair of first grooves and the pair of second grooves, respectively, when the bellows is compressed to support the median ring and swing at least one of the first flange and the second flange.

6. A vibration-isolator joint for a vacuum device, comprising a plurality of joint members vertically joined in series, each of said joint members comprising:

a bellows having an internal evacuation passage;

a first flange provided on a first end of the bellows;

a second flange provided on a second end of the bellows;

at least one first support part provided on the first flange facing the second flange; and at least one second support part provided on the second flange at a location in opposition to the at least one first support part;

said first flange of each of the plurality of joint members being connected to a vacuum chamber, said second flange of each of the plurality of joint members being connected to a vacuum pump, wherein the at least one first support part and the at least one second part are brought into line or point contact with each other when the bellows is compressed to swing at least one of the first flange and the second flange.

* * * * *

UNITED STATES PATENT AND TRADEMARK OFFICE
CERTIFICATE OF CORRECTION

PATENT NO. : 6,065,780

DATED : May 23, 2000

INVENTOR(S): Hiroshi HIROSHIMA

It is certified that an error appears in the above-identified patent and that said Letters Patent is hereby corrected as shown below:

On the Title Page, Item [73] the Assignee should read as follows:

[73] Assignee: Agency of Industrial Science & Technology, Ministry of International Trade & Industry, Tokyo, Japan Signed and Sealed this Twenty-second Day of May, 2001

*Attest:*

NICHOLAS P. GODICI

*Attesting Officer*     *Acting Director of the United States Patent and Trademark Office*